United States Patent [19]

Grieve

[11] Patent Number: 4,892,030

[45] Date of Patent: Jan. 9, 1990

[54] AIRFLOW DISTRIBUTION SYSTEM FOR DISCHARGING AIR FROM A THIN PLENUM, AND OVEN EMPLOYING SAME

[75] Inventor: Douglas V. Grieve, Lake Forest, Ill.

[73] Assignee: The Grieve Corporation, Round Lake, Ill.

[21] Appl. No.: 377,143

[22] Filed: Jul. 10, 1989

Related U.S. Application Data

[62] Division of Ser. No. 217,392, Jul. 11, 1988, Pat. No. 4,869,155.

[51] Int. Cl.[4] .......... A21B 1/26

[52] U.S. Cl. .......... 98/1; 34/225; 126/21 A; 98/40.01; 219/400

[58] Field of Search .......... 98/1, 40.01, 40.1, 40.18, 98/40.2, 101, 103, 108, 121.1, 115.3; 34/225, 233; 126/21 A; 219/400

[56] References Cited

U.S. PATENT DOCUMENTS

| | | | |
|---|---|---|---|
| 3,452,447 | 7/1969 | Gardner | 34/156 |
| 3,570,385 | 3/1968 | Heisterkamp | 98/32 |
| 3,823,488 | 7/1974 | Houben et al. | 34/156 |
| 3,957,187 | 5/1976 | Puigrodon | 226/7 |
| 3,979,038 | 9/1976 | Karlsson | 226/97 |
| 4,085,522 | 4/1978 | Stroszynski | 34/156 |
| 4,501,553 | 2/1985 | Imose et al. | 432/59 |
| 4,726,285 | 2/1988 | Kelley | 98/40.11 |

FOREIGN PATENT DOCUMENTS

| | | | |
|---|---|---|---|
| 932135 | 5/1982 | U.S.S.R. | 98/40.01 |
| 1315752 | 6/1987 | U.S.S.R. | 98/40.01 |

OTHER PUBLICATIONS

Photo No. 225–Grieve–Hendry Co., Inc.
Photo No. 434–The Grieve Corporation.
Photo No. 501–The Grieve Corporation.
"Grieve Ovens and Furnaces" General Catalog of The Grieve Corporation.

*Primary Examiner*—Harold Joyce
*Attorney, Agent, or Firm*—McCaleb, Lucas & Brugman

[57] ABSTRACT

An airflow distribution system for discharging air from a thin plenum chamber into a relatively larger space such as a discharge duct or the work chamber of an industrial oven. A distribution plate separating the chambers has discharge openings arranged in pairs, having diagonally oriented louvers sufficiently closely spaced to direct individual air streams toward one another where by combine as a resultant air stream flowing transversely outwardly from the distribution plate. The louvers are illustrated as circular or rectangular tabs partly punched from the plate in forming the discharge openings and are adjustable by bending to vary the direction and volume of the resultant air streams. Among the examples disclosed are industrial ovens and air discharge ducts.

10 Claims, 3 Drawing Sheets

FIG. 9
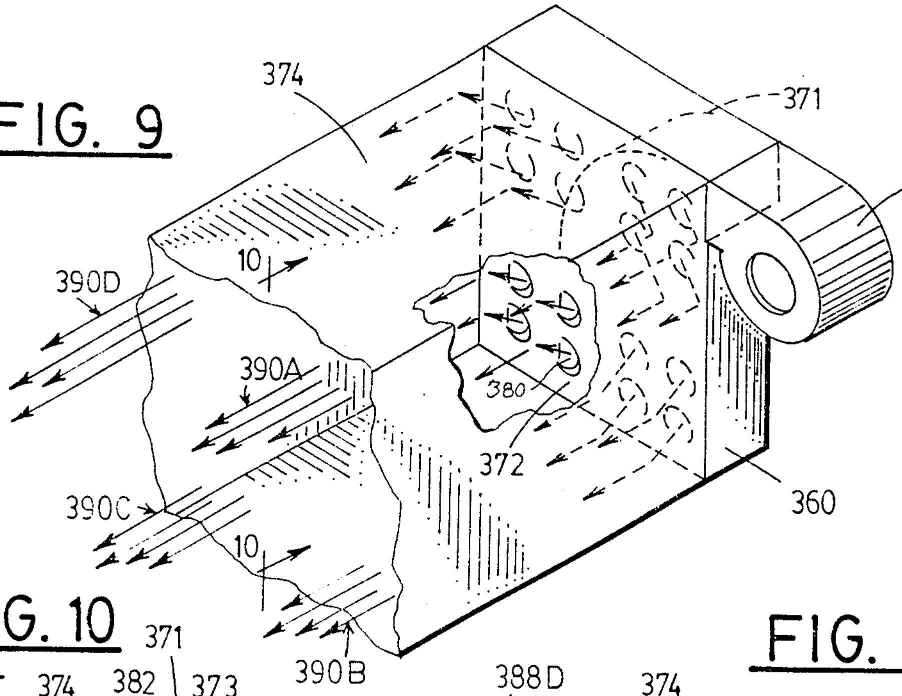
FIG. 10
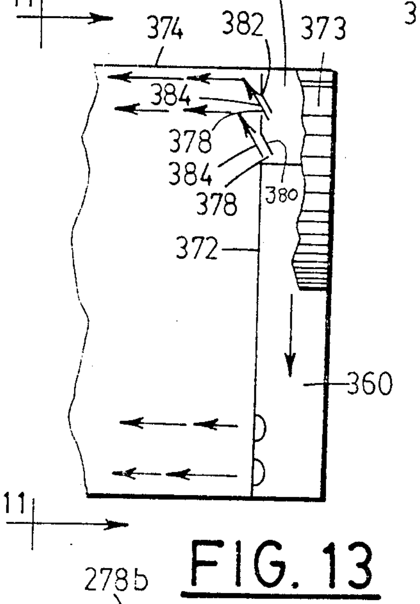
FIG. 11
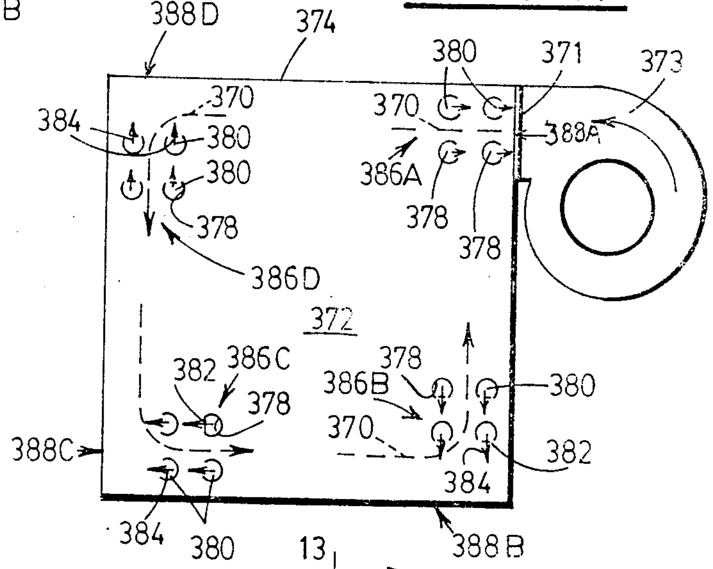
FIG. 13
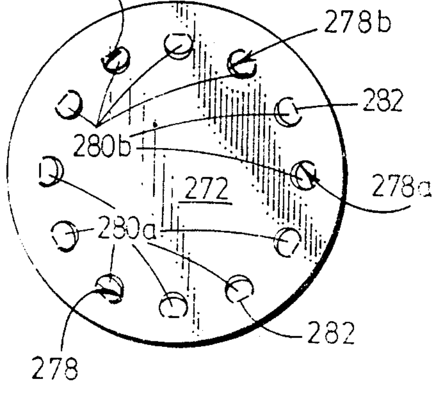
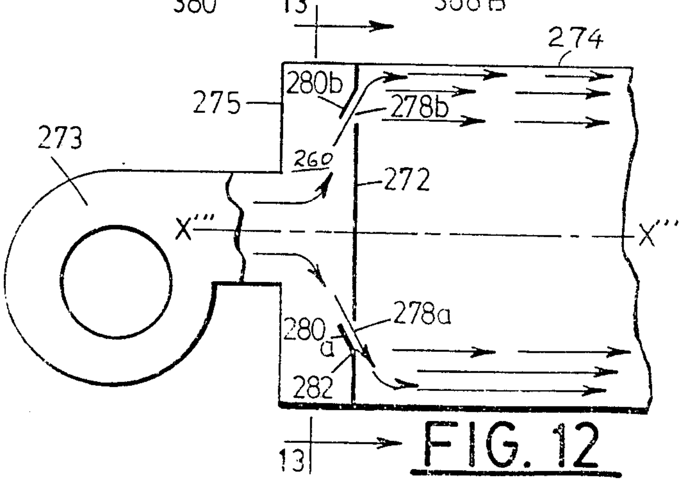
FIG. 12

AIRFLOW DISTRIBUTION SYSTEM FOR DISCHARGING AIR FROM A THIN PLENUM, AND OVEN EMPLOYING SAME

BACKGROUND OF THE INVENTION

This is a divisional of copending application Ser. No. 07/217,392, filed July 11, 1988 now U.S. Pat. No. 4,869,155.

This invention relates to an airflow distribution system where air is discharged from a relatively thin or shallow plenum chamber into a relatively large work space, chamber, or duct.

One application for this invention is in industrial ovens. Typically, there is a thin, shallow plenum on one or more sides of the oven housing, each with an apertured distribution plate directing air into a relatively large, central work chamber where products are supported for operations such as drying, baking, sterilizing, preheating, dehydrating, and curing.

Uniform air distribution within the oven work space is very important in order to maintain uniformity of temperature and processing times throughout. Conventional ovens have had serious drawbacks from the standpoint of uniformity. FIG. 8 is a schematic representation of typical prior art ovens. This is a composite representation showing, on opposite sides, examples of two conventional air distribution plates which have been used prior to the present invention.

In FIG. 8, the oven 20 has an inlet 22 with heating coils 24. Air flows to relatively thin, shallow plenum chambers 26 and 28 and passes through distribution plates 30 and 32 into a work chamber 34 from which it exits through outlet 36.

Most of these prior art ovens have air distribution plates such as that designated 30 for plenum chamber 28 in FIG. 8. It has an array of openings 38. Typically, the air direction and velocity in the shallow plenum chamber 28 carries through the openings 38 into the work space 34 as shown by the arrows 40 in FIG. 8. The angular components of the individual air streams passing through openings 36 are clearly indicated by arrows 40. Another drawback of openings 38 is that they are not adjustable.

Other prior art ovens have air distribution plates such as that designated 32 shown on the left side of FIG. 8. It has an array of openings 42 each with an angled tab or louver 44. All the tabs or louvers are bent in the same general direction. Airflow is adjustable by bending the tabs and flows into the work chamber generally parallel to the bent tabs in the direction of the arrows 46.

For both of the prior art distribution plates (30 or 32) shown in FIG. 8, the airflow into the work chamber is non-uniform causing heating and processing conditions to vary.

BRIEF SUMMARY OF THE INVENTION

Applicant has determined that by rearranging the prior art tabs 44 (FIG. 8) to place them in opposed pairs with their respective air streams directed diagonally toward one another, they will cancel one another and combine to provide a resultant air stream flowing transversely outwardly from the distribution plate directly into the work chamber. By providing a plurality of such opposed pairs, multiple resultant air streams transverse to the distribution plate will flow into and through the work chamber providing a dramatic improvement in the uniformity of the air distribution. As a result, temperature uniformity and processing uniformity in the work chamber are substantially improved.

Accordingly, it is a general object of the present invention to improve the uniformity of airflow from a shallow plenum chamber into a relatively larger work chamber or discharge duct.

Another object is to provide an airflow distribution system of simple construction for projecting transverse streams of air from a distribution plate at or nearly at right angles to the plate.

Another object is to provide such a system in which opposed pairs of louvers in the distribution plate comprise oppositely directed tabs formed from the plate while punching corresponding discharge openings in the plate, the tabs being bendable to regulate the velocity and direction of air flowing through the openings.

Another object of the invention is to provide such a system in which the diagonally opposed pairs of louvers have the same but opposite angular orientations to produce resultant air streams at right angles to the distribution plate.

Another object of the invention is to provide such a system in which the diagonally opposed pairs of louvers have different opposite angular orientations to produce resultant air streams generally transverse to but not precisely at right angles to the distribution plate to direct extra airflow to needed areas such as toward an oven doorway.

Another object of the invention is to provide such a system in which different opposed pairs of louvers are diagonally orientations at different angles to selectively increase or decrease the flow of air to different zones in a work space, work chamber, or duct.

Another object is to provide such a system in which the discharge openings are located at the periphery of the discharge plate around a common central axis intersecting both the plenum chamber and the work chamber, the opposed pairs of louvers being diametrically positioned on opposite sides of the axis and diagonally oriented to direct pairs of individual air streams toward the axis and toward one another to thereby combine into a resultant air stream flowing transversely outwardly from the distribution plate into the work chamber along that central axis.

Another object is to provide such a system in which the discharge openings are located at the periphery of the discharge plate around a common central axis intersecting the plenum and work chambers, the opposed pairs of diametrically-positioned louvers on opposite sides of the axis being angularly oriented to direct air streams from the corresponding discharge openings diagonally against the side wall or walls of the work chamber to produce in effect a hollow, annular cross-section air stream flowing outwardly from the distribution plate along the side wall or walls.

Another object is to provide such a system in which an inlet opening into the plenum chamber is through a side wall to direct air tangentially into the plenum chamber and thereby provide a spiral direction of airflow about the axis of the plenum and work chambers, the work chamber being polygonal in cross-section with separate side wall sections and the distribution plate having a corresponding polygonal shape, the outlet from the plenum chamber comprising a plurality of discharge openings at the corners of the distribution plate, and the diagonal louvers secured to the edges of the openings are oriented to direct separate air streams from the corresponding discharge openings diagonally against the corresponding side wall section to prevent the spiral airflow from being transmitted from the plenum chamber spirally into the work chamber and thereby produce resultant air streams flowing transversely outwardly from the distribution plate in the corners of the work chamber between adjacent side walls.

Another object is to provide such a system in an oven in which the work chamber is a heat treatment chamber.

BRIEF DESCRIPTION OF THE DRAWINGS

Other objects and advantages will be apparent from the following description taken in connection with the accompanying drawings in which:

FIG. 9 is another embodiment of the invention;

FIG. 10 is longitudinal cross-section of FIG. 9 taken along line 10—10;

FIG. 11 is a left hand view of FIG. 10 taken in the direction of the arrows 11—11;

FIG. 12 is a view similar to FIG. 5 of another embodiment; and

FIG. 13 is a cross-sectional view of FIG. 12 taken along line 13—13.

Like parts are designated by like reference characters throughout the figures of the drawings.

DESCRIPTION OF THE PREFERRED EMBODIMENTS

Figure 1:
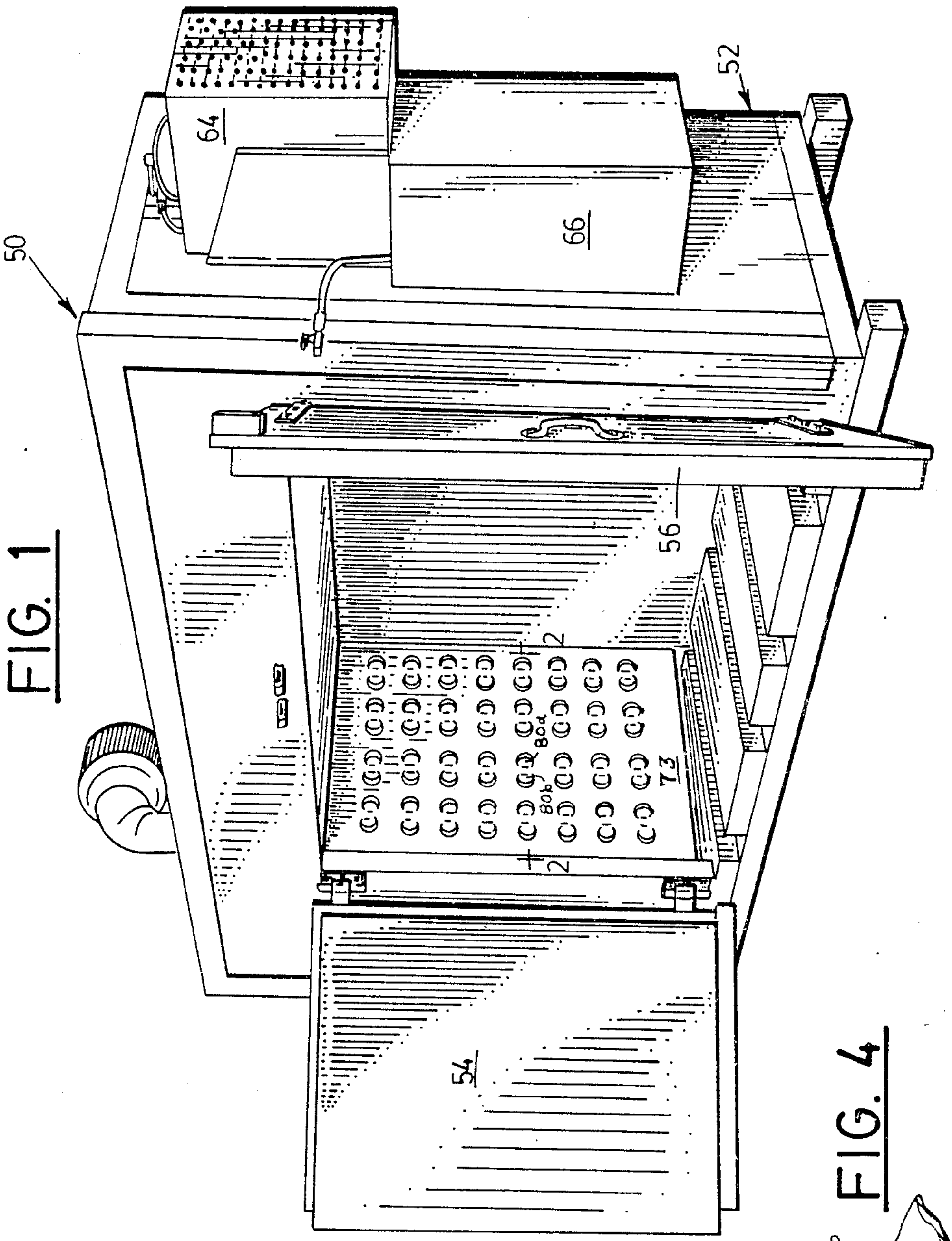
FIG. 1 is a perspective view of an industrial oven illustrating one form of the present invention.
Figure 3:
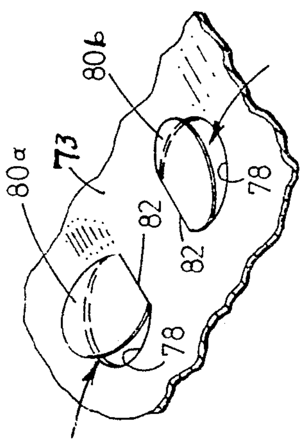
FIG. 3 is a fragmentary, enlarged, perspective view of a pair of oppositely directed louvers taken generally in the direction of the arrows 3—3 in FIG. 2.
Figure 2:
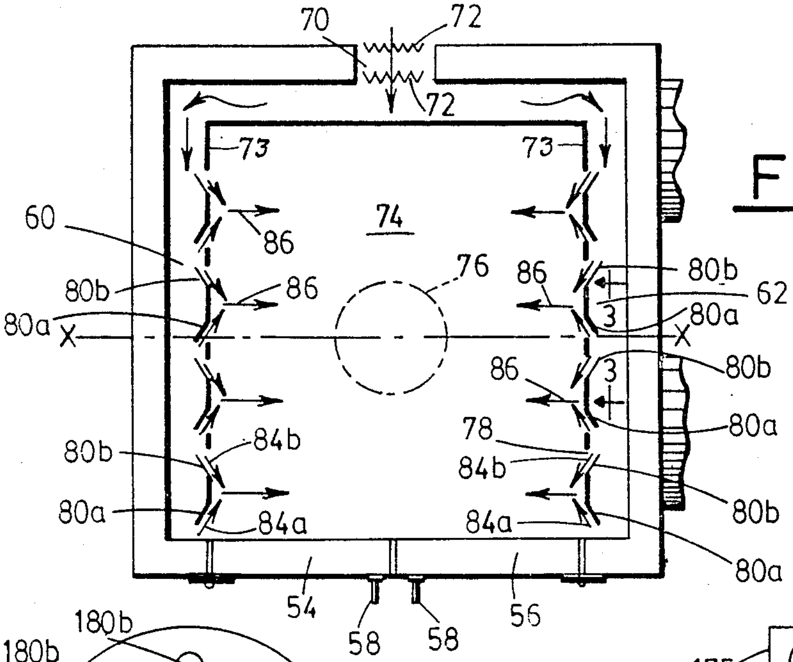
FIG. 2 is a schematic representation showing a cross-section of the oven taken along line 2—2 of FIG. 1.

Referring now to the specific embodiments of the invention shown in the drawings, an industrial oven is shown in FIGS. 1, 2 and 3. It is generally designated 50 and comprises a housing 52 with a pair of insulated doors 54, 56 with handles 58 and inlet plenum chambers 60, 62 on opposite sides of a central work or heat treatment chamber 74. Control equipment (not shown in detail) is contained in control boxes 64, 66 at the right side of the housing. FIG. 2 shows the oven schematically with somewhat less detail than shown in FIG. 1. Air, driven by a blower (not shown), flows through an inlet port 70 across heater elements 72 into the pair of opposite, thin, shallow side plenum chambers 60, 62, through distribution plates 73,73 into central work or heat treatment chamber 74, and out an exit port 76.

The distribution plates 73,73 comprise common walls between a corresponding plenum chamber 60 or 62, and the central heat treatment chamber 74.

Each distribution plate 73 has a plurality of discharge openings 78. As shown in FIG. 3, the discharge openings 78 are arranged in opposed pairs, having diagonal louvers **80*a* and 80*b*, consisting of circular tabs partially punched from plate 73, attached to the plate along hinge lines 82 and extending diagonally in opposite directions. As shown in FIG. 2, the air follows the louvers in oppositely directed, individual, converging streams 84*a*, 84*b*. In FIGS. 1, 2, and 3 the louvers are at the same angle, so that each pair of streams 84*a*, 84*b* cancel one another out and produce a resultant air stream 86 which is directed at right angles from the distribution plate into the heat treatment chamber 74. In the present example, there are thirty-two pairs of oppositely directed louvers 84*a*, 84*b* in each distribution plate 73. These are best shown in FIGS. 1 and 2 and provide thirty-two resultant air streams 86 flowing inwardly at right angles to the distribution plates, and parallel to the main oven central axis X—X (FIG. 2) which extends between the plenum chambers 60, 62 and the heat treatment chamber 74**.

Typically, the pairs of opposed louvers **80*a*, 80*b* would be positioned to distribute air at each shelf level within the oven (assuming it is an oven with shelves). The pairs of louvers at the various levels would be bent upon their hinge lines 82** to open or close them depending on whether the particular location needed more or less air. Further, as will be described in connection with FIG. 7, some of the opposing louvers may be opened at different angles to increase the flow of air selectively toward the doors of the oven. As in the case of a relatively cooler door throat illustrated in FIG. 7, the opposing louvers will be opened non-uniformly to direct extra heated air toward the front of the oven.

Figure 4:
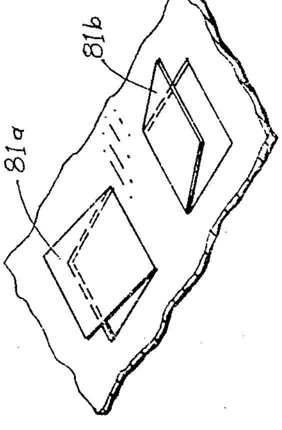
FIG. 4 is a view similar to FIG. 3 showing modified forms of louvers.

The louvers **80*a* and 80*b* shown in FIGS. 1-3 are substantially circular (except along the hinge lines 82) as a result of partially punching out the circular discharge openings 78. They may be any other suitable shape, for example, rectangular or square as shown in FIG. 4, as stated, one advantage is that they may be bent along their respective hinge lines to adjust the flow rates and directions of the corresponding individual air streams 84*a*, 84*b***.

Figure 7:
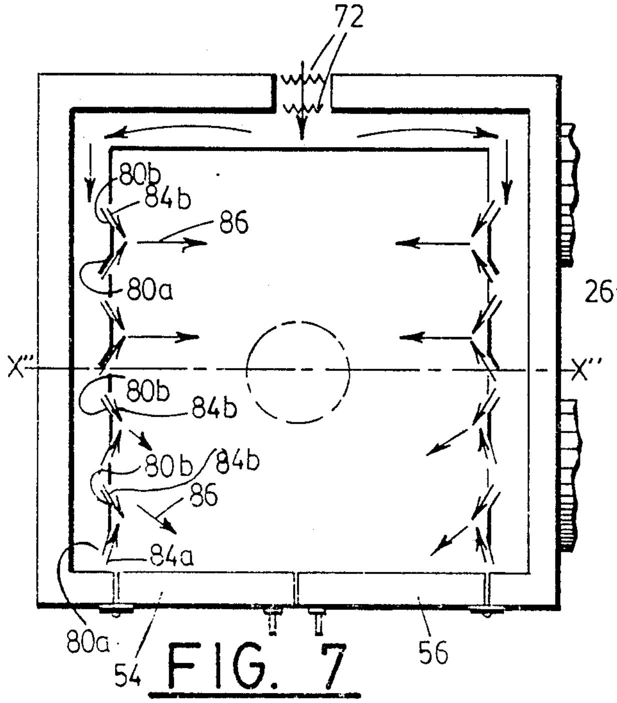
FIG. 7 is a schematic cross-section similar to FIG. 2 showing a modified arrangement of louvers.

As shown in FIG. 7, louvers **80*b* in some of the pairs at the front of the oven may be opened a little more than louvers 80*a*. This increases the flow rate of the corresponding individual streams 84*b* relative to the streams 84*a* causing the resultant combined streams 86 to deflect forwardly toward the doors 54, 56** and provide more heated air to compensate for heat loss at the door throat area.

Figure 5:
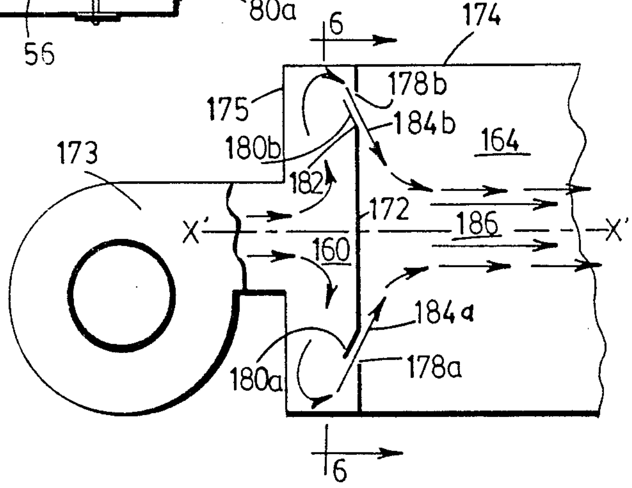
FIG. 5 is a schematic representation of an alternate form of the invention.
Figure 6:
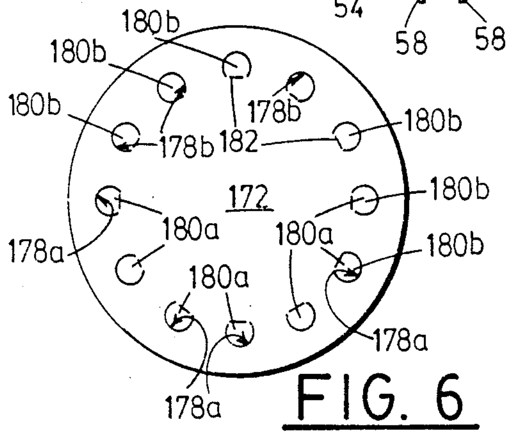
FIG. 6 is a cross-section of FIG. 5 taken along line 6—6.

Referring now to the embodiments shown in FIGS. 5 and 6, this illustrates a circular array of oppositely directed diagonal louvers **180*a*, 180*b* diametrically positioned in pairs in the distribution plate 172 around the axis X'—X'. As shown in FIG. 5, this concentrates airflow at the center of the duct 174 along the axis X'—X'. A blower 173 discharges through an end wall 175 into a shallow plenum chamber 160. The distribution plate 172 is a common wall separating the plenum chamber 160 from duct chamber 164. A plurality of pairs of generally circular discharge openings 178*a*, 178*b* correspond to the louvers 180*a* and 180*b* and are likewise diametrically opposed to one another in a circular array around the central axis X'—X'. The louvers 180*a* and 180*b* are fastened to the distribution plate 172 at their inner edges and bent along hinge lines 182 inwardly into the plenum chamber 160 as best shown in FIG. 5**.

Referring now to the embodiment shown in FIGS. 12 and 13, this reverses the embodiment shown in FIGS. 5 and 6 in that it provides an annular, "hollow" stream of air flowing along the internal wall of duct 274, with relatively less flow along central axis X'''—X'''. FIGS. 12 and 13 show diametrically opposed pairs of louvers 280a, 280b arranged in distribution plate 272 in a circular array about axis X'''—X'''. A blower 273 discharges through an end wall 275 into a shallow plenum chamber 260. The distribution plate 272 has a plurality of pairs of diametrically opposed circular discharge openings 278a, 278b with bent tabs forming the corresponding diagonal louvers 280a, 280b. They are fastened to the plate 272 along hinge lines 282 at their outer edges and are bent inwardly into the plenum chamber 260 as shown in FIG. 12. The louvers direct air streams 278a and 278b outwardly and forwardly toward the wall of duct 274. All the individual streams combine to provide a relatively fast annular cross-section, "hollow" air stream along the inside of the duct wall as indicated by the arrows in FIG. 12. Relatively slower air movement occurs at the center along axis X'''—X'''.

The embodiments shown in FIGS. 5–6 and 12–13 are examples where round- or square-shaped tabs are especially useful because they can be spaced closely together and in a circular array. By contrast, it would be impractical to use long, narrow "jalousie-type" louvers.

As stated, the louvers of the present invention are readily adjustable simply by bending them along their hinge lines. They maintain their adjustment in spite of heating and cooling cycles and vibration, in contrast with bolted louvers which may loosen.

As illustrated in FIGS. 5, 7, and 12, the louvers of the present invention can be used to aim air at regions which require increased airflow within a relatively large volume work space or duct. Increasing the flow of heated air toward a doorway of a high temperature oven, as shown in FIG. 7 for example, compensates for the inherently greater heat loss at that location. Increasing the flow of heated air along the wall of a duct, as shown in FIG. 2, increases heat transfer through the duct wall.

Figure 8:
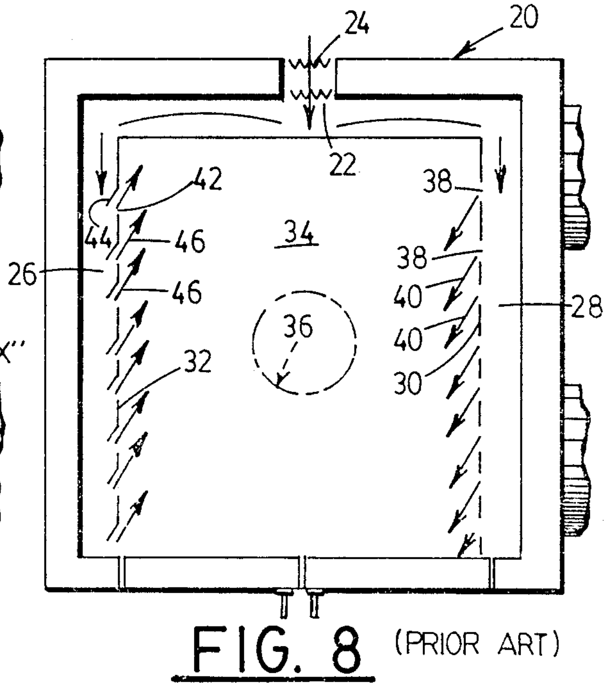
FIG. 8 (PRIOR ART)
FIG. 8 is a schematic cross-section similar to FIGS. 2 and 7 showing two prior art examples of air distribution plates which have been used prior to the present invention.

Another application for the present invention is to control the direction of flow in the manner shown in FIGS. 9, 10, and 11. This is typical of an installation where, for space saving or other reasons, there is a very thin plenum chamber 360 with a side-mounted blower 373 directing air tangentially into the plenum chamber 360 through a corner opening 371. This causes the air stream to flow spirally around inside the plenum chamber as indicated by broken line arrows 370 in FIG. 11. If distribution plate 372 which separates the plenum chamber 360 from the main duct or work chamber 374 had simple openings such as the simple prior art openings designated 38 in FIG. 8, the spiral airflow 370 would carry through the distribution plate 372 into the duct or work chamber 374. Spiral airflow in the main duct chamber 374 is of course objectionable because it unnecessarily dissipates energy transferred into the air stream by the blower.

Ideally, once the air stream enters the main duct chamber 374, it should flow parallel to the axis of the duct. That is made possible by the louver arrangement shown in FIGS. 9, 10, and 11 which will now be described, the plenum chamber 360 and duct 374 are polygonal in cross-section, specifically square in the present example. The distribution plate 372 comprises a wall which is common to the plenum and duct chambers. Plenum outlet means comprises a plurality of discharge openings 378 at each corner of the discharge plate. In the present example, there are two pairs of discharge openings 378 at each corner. Louvers 380 are secured to the edges of the openings 378 along hinge lines 382. These are diagonally oriented to direct air streams 384 from the corresponding discharge openings 378 diagonally against a corresponding one of the duct chamber walls adjacent a corresponding corner, as best shown in FIG. 10. Specifically, referring to FIG. 11, four-louver groups 386A, 386B, 386C and 386D direct diagonal air streams at side walls 388A, 388B, 388C, and 388D respectively. As shown in FIGS. 9 and 10, the resultant streams 390A, 390B, 390C, and 390D flow forwardly along the inside corners of the duct. As they get farther along the duct, they will gradually mingle, merging into one stream filling the duct, and flowing parallel to the axis of the duct.

The embodiments described and shown to illustrate the present invention have been necessarily specific for purposes of illustration. Alterations, extensions, and modifications would be apparent to those skilled in the art. The aim of the appended claims, therefore, is to cover all variations included within the spirit and scope of the invention.

The embodiments of the invention in which an exclusive property or privilege is claimed are defined as follows:

1. An airflow distribution system comprising: an inlet plenum chamber, a discharge duct extending along a longitudinal axis intersecting said plenum chamber, and a fluid distribution plate forming a common wall therebetween;

said plenum chamber having inlet and outlet means for directing a flow of fluid through the plenum chamber into the duct;

said outlet means comprising a plurality of discharge openings in said distribution plate arranged in a predetermined array around said longitudinal axis, said plate having diagonal louvers secured to the edges of said openings, said louvers having substantially the same orientation relative to said longitudinal axis to thereby direct individual streams of fluid outwardly from the distribution plate into and along the discharge duct where the individual streams merge and combine into a resultant fluid stream flowing along said axis through a predetermined portion of the cross sectional area of the discharge duct.

2. An airflow distribution system according to claim 1 in which said diagonal louvers are radially directed in the same general direction relative to the longitudinal axis.

3. An airflow distribution system according to claim 2 in which said diagonal louvers are directed inwardly toward the longitudinal axis to thereby combine the individual streams into a resultant fluid stream flowing at an accelerated rate transversely outwardly from the distribution plate into the discharge duct along said axis.

4. An airflow distribution system according to claim 2 in which said diagonal louvers are directed outwardly from the longitudinal axis to thereby combine the individual streams into a resultant hollow or annular fluid stream flowing at an accelerated rate transversely outwardly from the distribution plate into the discharge duct along the margins of the duct.

5. An airflow distribution system according to claim 2 in which said discharge duct has wall means extending along said longitudinal axis and said diagonal louvers are directed radially outwardly toward said wall means to thereby combine the individual fluid streams into a single substantially annular cross-section fluid stream flowing transversely outwardly from the distribution plate in the discharge duct along the wall means.

6. An airflow distribution system according to claim 2 in which said discharge duct is polygonal in cross-section with separate side wall sections, and said distribution plate has a corresponding polygonal shape, said outlet means comprises a group of discharge openings at each corner of the distribution plate, and said diagonal louvers in each of said groups are oriented to direct separate air streams from the individual discharge openings diagonally against a corresponding one of the discharge duct side wall sections to thereby provide resultant merged fluid streams flowing outwardly from the distribution plate along the corner areas between the discharge duct side wall sections.

7. An airflow distribution system according to claim 2 in which said discharge duct has wall means extending along said longitudinal axis and said diagonal louvers are oriented to direct the individual streams of fluid diagonally against the wall means where they combine into a resultant fluid stream flowing along the wall means.

8. An airflow distribution system comprising:

an inlet plenum chamber, a relatively large volume discharge chamber, and a distribution plate therebetween;

said plenum chamber having walls with inlet and outlet means for directing a flow of fluid through the plenum chamber into the discharge chamber;

said discharge chamber having side wall means defining a use area for fluid from the plenum chamber;

said distribution plate comprising a common wall separating the plenum chamber and discharge chamber and disposed along a longitudinal axis intersecting the plenum chamber and discharge chamber, said plenum chamber being substantially thinner than said discharge chamber along said axis; and said outlet means comprising a plurality of discharge openings around the periphery of said distribution plate, said plate having diagonal louvers secured to the edges of said openings, said louvers being diagonally oriented to direct air streams from the corresponding discharge openings diagonally against the side wall means of the discharge chamber to produce at least one resultant air stream flowing outwardly from the distribution plate along the side wall means of the discharge chamber generally parallel to said axis.

9. An airflow distribution system according to claim 8 in which the inlet means for the plenum chamber is through a side wall for directing air tangentially into the plenum chamber to provide a spiral direction of airflow about said axis within said plenum chamber, said discharge chamber is polygonal in cross-section and said side wall means comprises separate side wall sections, and said distribution plate has a corresponding polygonal shape, said outlet means comprises a group of discharge openings at each corner of the distribution plate, and said diagonal louvers in each group are oriented to direct separate air streams from the corresponding discharge openings diagonally against a corresponding one of said discharge chamber side wall sections to prevent said spiral airflow from being transmitted into said discharge chamber and thereby produce resultant air streams flowing outwardly from the distribution plate along the corner areas of the discharge chamber side walls.

10. An airflow distribution system according to claim 9 in which said discharge chamber has a square or rectangular cross section with four side wall sections defining four corner areas, said distribution plate has a corresponding square or rectangular shape, and there are four groups of said discharge openings, each group located in a corresponding corner of the distribution plate.

* * * * *